Oct. 25, 1960 J. A. STEDMAN ET AL 2,957,248
MICROMETER THIMBLE ADJUSTMENT
Filed June 9, 1958
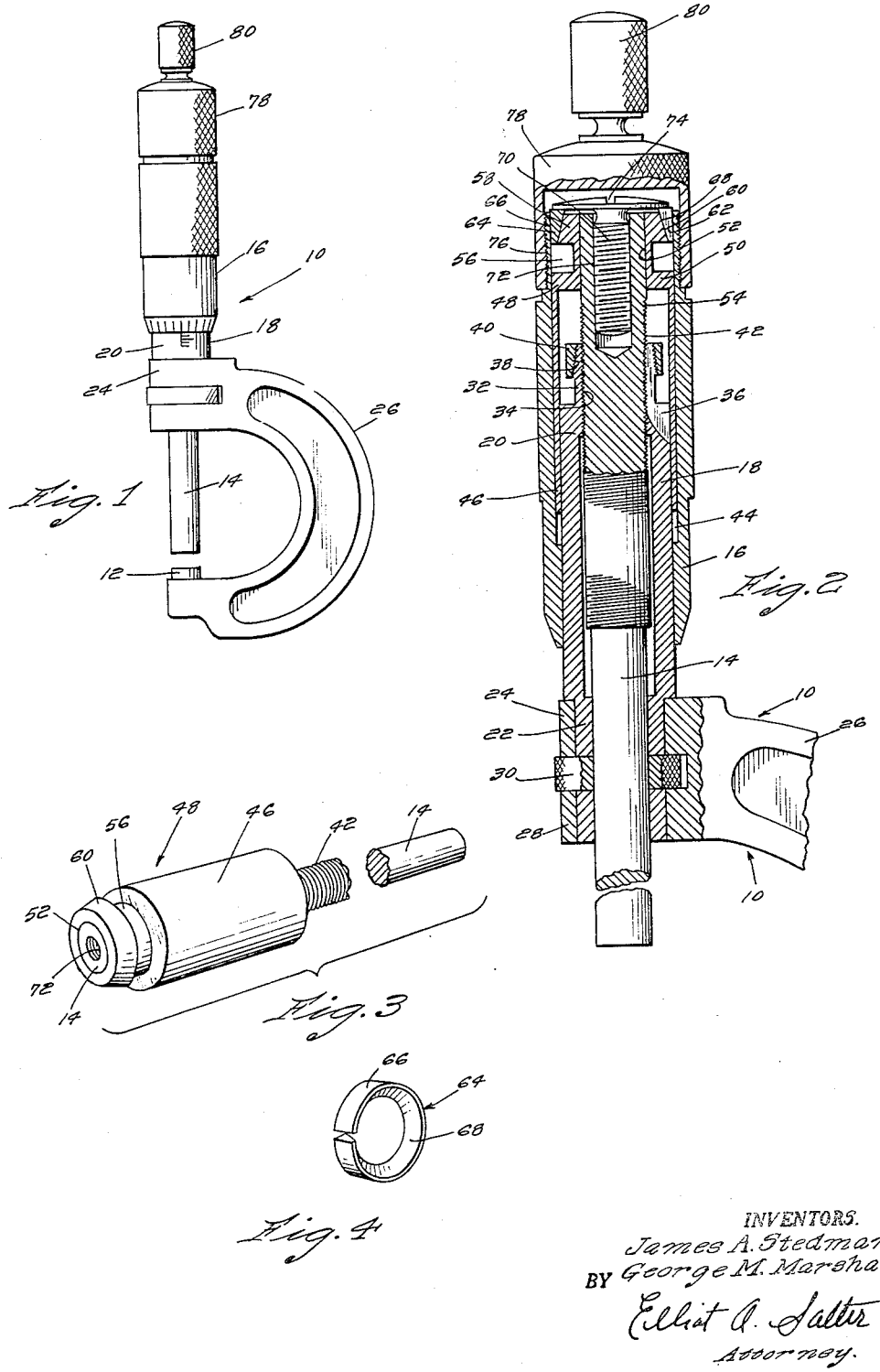
INVENTORS.
James A. Stedman.
BY George M. Marshall
Elliot A. Salter
Attorney.

United States Patent Office 2,957,248
Patented Oct. 25, 1960

2,957,248

MICROMETER THIMBLE ADJUSTMENT

James A. Stedman, Cranston, and George M. Marshall, West Warwick, R.I., assignors to Central Tool Company, Cranston, R.I., a corporation of Rhode Island Filed June 9, 1958, Ser. No. 740,856

2 Claims. (Cl. 33—164)

This application is a continuation-in-part of co-pending application Serial No. 542,226, filed October 24, 1955.

The present invention relates to precision measuring tools, and has particular reference to a novel construction for a micrometer caliper.

The principal object of the instant invention is the provision of a simple micrometer caliper assembly which may be readily adjusted to compensate for wear on the faces of the anvil and spindle and on the threads of the spindle and barrel.

Another object of our invention is the provision of a manually controlled thimble release which enables the thimble of a micrometer caliper to be readily adjusted for obtaining an accurate zero setting at all times.

Another object of this invention is the provision of a novel and improved micrometer thimble adjustment for obtaining an accurate zero reading, which adjustment may be made by using a simple screw driver or small coin, and which does not require the use of special wrenches and the like.

Still another object of the instant invention is the provision of a micrometer thimble adjustment which requires a minimum number of individual parts and which therefore is simple and economical to manufacture and assemble.

A further object of the present invention is the provision of a micrometer thimble adjustment of the character described which is effective and durable in use and which may be readily manipulated with a minimum of difficulty.

Other objects, features and advantages of the invention will become apparent as the description thereof proceeds when considered in connection with the accompanying illustrative drawings.

In the drawings which illustrate the best mode presently contemplated by us for carrying out our invention:

Fig. 1 is a side elevation of a micrometer caliper embodying the instant invention;

Fig. 2 is an enlarged fragmentary elevational view, partly in section, showing the spindle and barrel assembly;

Fig. 3 is a perspective detail, on an enlarged scale, illustrating the sleeve and spindle assembly; and Fig. 4 is a perspective detail, on an enlarged scale, of the split conical washer which forms a part of our invention.

It has been found desirable to provide a micrometer caliper with simplified means for adjusting the thimble whereby an accurate zero setting may be easily obtained at all times, and without the necessity of utilizing specially designed wrenches and the like. As will be obvious, the accuracy of the zero setting in a micrometer caliper is highly important, and said accuracy may be impaired after continued usage of the micrometer due to wear between the end faces of the anvil and spindle, as well as wear which may take place between the threads of the spindle and barrel. Accordingly, I have provided a micrometer having the thimble loosely mounted in concentric relation to the barrel, the latter of which threadedly receives the spindle in conventional fashion. The spindle has secured thereto a specially designed sleeve or cartridge member which cooperates with a hardened and tempered split tapered ring to releasably lock the thimble to the spindle. More specifically, our improved sleeve or cartridge member cooperates with the thimble to define a tapered annular recess therebetween, which recess receives the split tapered ring whereupon wedging of the latter therein radially expands the ring into frictional gripping engagement with the interior surface of the thimble.

Referring now to the drawings, the illustrative micrometer caliper 10 is of the C type and includes an anvil 12, a spindle 14, a thimble 16, and a barrel 18, note Fig. 2. The barrel 18 includes a cylindrical body portion 20 having a lower circular flange 22 of reduced diameter seating within an upper bushing 24 of the C-shaped anvil frame 26, a lower cylindrical bushing 28 and a loosely mounted split lock ring 30 of known type and forming a vertically disposed mounting channel for the spindle 14.

The upper end 32 of the barrel is of a reduced diameter and is internally threaded as indicated at 34; the said upper end and the contiguous barrel portion having segments defined by equi-spaced vertical slots 36, preferably three in number. The upper end 32 of barrel 18 is tapered on its outer surface and is provided with external threads as illustrated at 38, whereby internally threaded adjustment ring 40 may be moved down over the threads 38 to draw the said upper segments radially inward. This insures that the upper externally threaded portion 42 of spindle 14 will make secure threaded engagement with the barrel internal threads 34, whereby rotation of the barrel raises and lowers the spindle in customary and well-known fashion.

The thimble 16 is vertically recessed along its inner circumferential surface as indicated at 44 to provide a space for receiving the depending cylindrical skirt portion 46 integrally carried by sleeve or cartridge member 48, note Fig. 3. Sleeve or cartridge member 48 is provided with a thickened upper portion 50 defining a reduced bore 52 of substantially the same diameter as that of the upper end of spindle 14, which upper end is not threaded, it being noted that the threads 42 terminate at the point 54, note Fig. 2.

As will be seen most clearly in Figs. 2 and 3, the thickened upper portion 50 of sleeve or cartridge member 48 is provided with a circumferential groove 56, the purpose of which is to enable welding electrodes to be properly positioned for rigidly securing the said sleeve member to the spindle upper end. The upper extremity 58 of thickened portion 50 is beveled at its outer surface as at 60. As will be noted, beveled surface 60 and the upper interior surface of thimble 16 cooperate to define an annular tapering recess 62 within which is positioned split conical washer 64. Washer 64 is preferably of tempered and hardened steel and is provided with a straight outer surface 66 and a tapered inner surface 68 adapted to cooperate with beveled surface 60 whereby downward wedging of washer 64 within recess 62 will cause radial expansion of the washer to effect a frictional lock between the sleeve or cartridge member 48 carried by spindle 14 and thimble 16. More specifically, as will be seen most clearly in Fig. 2, washer 64 extends above the upper surface of spindle 14 and the adjacent thickened portion 58 whereby a downward thrust may be imparted thereto by means of screw 70 threadedly engaged within threaded bore 72 provided at the upper end of spindle 14. Thus, inward threading of the screw 70 will cause its head portion to engage the upper extremity of split washer 64 and wedge same downwardly into annular recess 62 so as to provide the desired frictional lock.

Conversely, loosening of screw 70 will release the lock and enable thimble 16 to be moved both radially and axially with respect to spindle 14 in order to achieve an accurate zero setting.

Screw 70 has its head slotted as at 74 whereby to facilitate manipulation thereof by means of a screw driver, coin, or the like, and hence it will be apparent that no specially designed wrenches or the like are necessary to effect desired adjustment of the instant micrometer caliper.

As will be seen most clearly in Fig. 2, the upper edge of thimble 16 is externally threaded as at 76 whereby to receive an internally threaded cover or cap member 78 having a manipulating portion 80. Cap member 78 not only acts as a cover for the upper portion of the barrel assembly, but it also simultaneously provides external supporting means for the thimble upper extremity whereby to insure that a tight, firm lock will be effected between said thimble upper portion and sleeve upper portion 58 when split washer 64 is wedged downwardly into locking position by means of screw 70 in the manner aforedescribed. It will be understood that when the micrometer 10 is in use, cap member 78 is threadedly engaged to thimble 16 in the manner illustrated in Fig. 2, whereupon, when it is desired to manipulate screw 70 in order to adjust the micrometer zero setting, the said cap member may be readily removed.

The operation and use of the instant invention are thought to be apparent from the foregoing description, it being understood that downward wedging of split washer 64 within annular recess 62 results in a secure gripping engagement between the thimble and the upper end of sleeve or cartridge member 48. Since the sleeve member in turn is secured to spindle 14, such as by welding or the like, it follows that when screw 70 is inwardly threaded to locking position, no relative movement between the thimble 16 and spindle 14 is possible. When it is desired to adjust the zero setting of micrometer 10, it is simply necessary to relieve the pressure exerted by screw 70 by threading it outwardly, whereupon the thimble 16 is no longer locked to spindle 14 and the desired adjustment may be made. Once the proper adjustment has been completed, screw 70 is tightened to once again wedge washer 64 into gripping engagement.

As will be apparent, the instant construction is relatively simple from a manufacturing and assembly standpoint since a minimum number of separate parts are required. Thus, the integral, one-piece sleeve or cartridge member 48 is secured to spindle 14 to form a sub-assembly which in turn may be readily and easily assembled with barrel 18 and thimble 16. The only additional parts which are required to effect our novel releasable lock are screw 70 and split washer 64.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except in so far as indicated by the scope of the appended claims.

We claim:

1. In a micrometer caliper, a barrel having its upper end internally threaded, a spindle threadedly mounted within said barrel and extending upwardly from the said upper end thereof, an integral, one-piece sleeve having a depending skirt slidably extending over the barrel and having its upper end secured to the spindle in axially spaced relation to the barrel upper end, said sleeve upper end comprising a thickened portion in engagement with said spindle, the outer surface of said thickened portion being beveled at its upper extremity, a thimble telescopingly mounted over said sleeve for rotatable and linear axial movement with respect thereto, the upper portion of said thimble extending at least beyond the lower edge of said sleeve bevel whereby a tapering annular recess is provided therebetween, said recess having therein a split washer having a frustro-conical inner surface corresponding to said aforementioned bevel, and means for wedging said washer therein for expanding same to lock the thimble and spindle upper portions to each other.

2. In the structure of claim 1, said sleeve thickened portion having a peripheral groove adjacent the lower edge of said bevel, the outer diameter of said portion below said groove being at least as great as that of the bevel lower edge, and identical to the outer diameter of said depending skirt.

References Cited in the file of this patent

FOREIGN PATENTS

| 323,060 | Germany | July 14, 1920 |
| 554,429 | Great Britain | July 2, 1943 |
| 902,571 | France | Dec. 15, 1944 |